United States Patent
Shusterman et al.

(10) Patent No.: US 6,463,113 B1
(45) Date of Patent: Oct. 8, 2002

(54) EXTERNAL SIGNAL ATTENUATOR FOR A SINGLE-ENDED TRANSMISSION LINE

(75) Inventors: Boris Isaak Shusterman, Newton, MA (US); John Eli Wonkka, Merrimack, NH (US)

(73) Assignee: Compaq Information Technologies Group, L.P., Houston, TX (US)

( * ) Notice: Subject to any disclaimer, the term of this patent is extended or adjusted under 35 U.S.C. 154(b) by 0 days.

(21) Appl. No.: 08/869,627

(22) Filed: Jun. 5, 1997

(51) Int. Cl.[7] ............................................. H04L 23/00
(52) U.S. Cl. ...................... 375/377; 333/81 R; 359/153
(58) Field of Search ................................. 375/256, 257, 375/258, 259, 377, 316, 285, 350; 333/24 R, 24.2, 81 R; 359/152, 153

(56) References Cited

U.S. PATENT DOCUMENTS

| | | | | |
|---|---|---|---|---|
| 4,535,256 A | * | 8/1985 | Reneau | |
| 4,810,873 A | * | 3/1989 | Ammann et al. | |
| 4,879,761 A | * | 11/1989 | Webb | |
| 5,212,378 A | * | 5/1993 | Uda | |
| 5,214,372 A | * | 5/1993 | Vaisanen et al. | |
| 5,453,610 A | * | 9/1995 | Gibbons | |
| 5,525,794 A | * | 6/1996 | Gibbons | |
| 5,586,145 A | * | 12/1996 | Morgan et al. | 375/239 |
| 5,600,472 A | * | 2/1997 | Uesaka | 359/161 |
| 5,751,803 A | * | 5/1998 | Shpater | 379/379 |
| 5,943,418 A | * | 8/1999 | Walker | 379/382 |

FOREIGN PATENT DOCUMENTS

JP       05153016 A  *  6/1993

OTHER PUBLICATIONS

Ron Clark et al., *RS–232C/422/485 line isolation solves more than fault problems*, EDN Design Feature, Sep. 28, 1995.

* cited by examiner

Primary Examiner—Jean Corrielus
(74) Attorney, Agent, or Firm—Conley, Rose & Tayon, P.C.

(57) ABSTRACT

A data signal attenuator is constructed to include an optocoupler, a biasing source for powering the optocoupler and restoring the amplitude of an originally transmitted signal, and a connector for connecting the attenuator to the exterior of a receiving device. When connected to the receiver, the attenuator electrically connects a single-ended data transmission line to the receiving device. The external connection of the attenuator to the receiving device thus enables existing receivers to have the benefits of an optocoupler based attenuator without the necessity of redesign.

31 Claims, 4 Drawing Sheets

EXTERNAL SIGNAL ATTENUATOR FOR A
SINGLE-ENDED TRANSMISSION LINE

FIELD OF THE INVENTION

This invention generally relates to filtering noise from a data signal and, more particularly, to filtering data signals received by receiving devices with optocoupler based filtering circuits.

BACKGROUND OF THE INVENTION

Single-ended data transmission lines are inexpensive unidirectional transmission lines for transmitting data signals from a network to a receiving device (receiver). Because of loading considerations, receivers utilizing single-ended lines require a high input impedance interface circuit to electrically connect the line to the receiver. Since the input impedance of the interface circuit is high, a relatively small change in the current through the line can significantly increase the voltage across the interface, thus corrupting the transmitted data signal. Accordingly, receivers utilizing single-ended transmission lines are very susceptible to noise in the transmission line. Such noise, which may be caused by surrounding energy fields, typically propagates at frequencies that are greater than about one megahertz.

The prior art has addressed this problem by including internal filtering devices within the receiver for filtering high frequency noise (frequencies greater than about one megahertz) from single-ended data transmission signals. Among those filters are passive filtering devices, which typically include a combination of resistors, capacitors, and/or inductors. Passive filtering devices are inefficient for such purposes, however, because they require that one or more of the resistors in the filter have a relatively high resistance value. This large resistance limits current flow through the line, thus impeding data transmission to the receiver.

Non-isolating active filtering devices also have been suggested for filtering high frequency noise from data transmission signals. Such filters often are expensive, however and can be damaged when a high energy noise burst is coupled into the transmission line. When the filtering device is damaged, the noise can couple with the receiver, thereby damaging the receiver and/or corrupting the received data transmission signal.

In response to these problems, electrically isolating optocouplers have been used for electrically isolating receivers from noise bursts through transmission lines. This isolation commonly is referred to as "galvanic isolation." In simplified terms, an optocoupler has a light emitting device (e.g., a light emitting diode, a/k/a "LED") that is driven by a data current signal, and a photodetector for detecting the light emitted by the light emitting device. The photodetector may be a phototransistor, which requires a biasing source for powering the phototransistor. The intensity and frequency of the light emitted by the LED vary in proportion to the intensity and frequency of the data current signal. When the photodetector detects the emitted light, it first regenerates an attenuated version of the original electrical signal from the received light, and then transmits the regenerated signal to the receiving device.

The degree of attenuation of the signal through an optocoupler is ascertained by the current transfer ratio (CTR), which is the ratio of current transmitted by the optocoupler to the current received by the optocoupler. Since the CTR of an optocoupler typically is less than one, the biasing source may be configured to restore the amplitude of the regenerated signal back to that of the received signal. Like the optocoupler, the biasing source is internal to the receiver.

Problems arise when an existing receiver does not include a low pass filter for minimizing the effects of high frequency noise from a received data signal. Such receivers consequently must be internally retrofitted to include such a filter. This requires that the receiver be disassembled and/or redesigned for the filter and biasing source to be appropriately connected. This redesign process is time consuming and inefficient. Moreover, many receivers cannot effectively be retrofitted with such filters even with a significant device redesign. Those receivers therefore continue to be susceptible to the adverse effects of high frequency noise.

Accordingly, it would be desirable to have a device that limits the adverse effects of high frequency line noise for receivers that do not include electrically isolated, internal noise reduction filters. It also would be desirable for such device to be used with such a receiver without requiring that the receiver be internally retrofitted to accommodate such device.

SUMMARY OF THE INVENTION

In accordance with the principles of the invention, an isolating data signal attenuator for filtering high frequency noise from a data signal is detachably connectible to the exterior of a receiver. The attenuator includes an optocoupler, a biasing source for powering the optocoupler and restoring the amplitude of the originally transmitted signal, and a connector for connecting the attenuator to the exterior of a receiving device. When connected to the receiver, the attenuator electrically connects a single-ended data transmission line to the receiver. The external connection of the attenuator to the receiver thus enables existing receivers to have the benefits of an optocoupler based attenuator without the necessity of an internal retrofit. Accordingly, the receiver is both electrically isolated from the network and substantially free of undesirable high frequency noise transmitted through the transmission line.

BRIEF DESCRIPTION OF THE DRAWINGS

The foregoing and other objects and advantages of the invention will be appreciated more fully from the following further description thereof with reference to the accompanying drawings wherein.

DETAILED DESCRIPTION OF THE ILLUSTRATIVE EMBODIMENT

Figure 1:
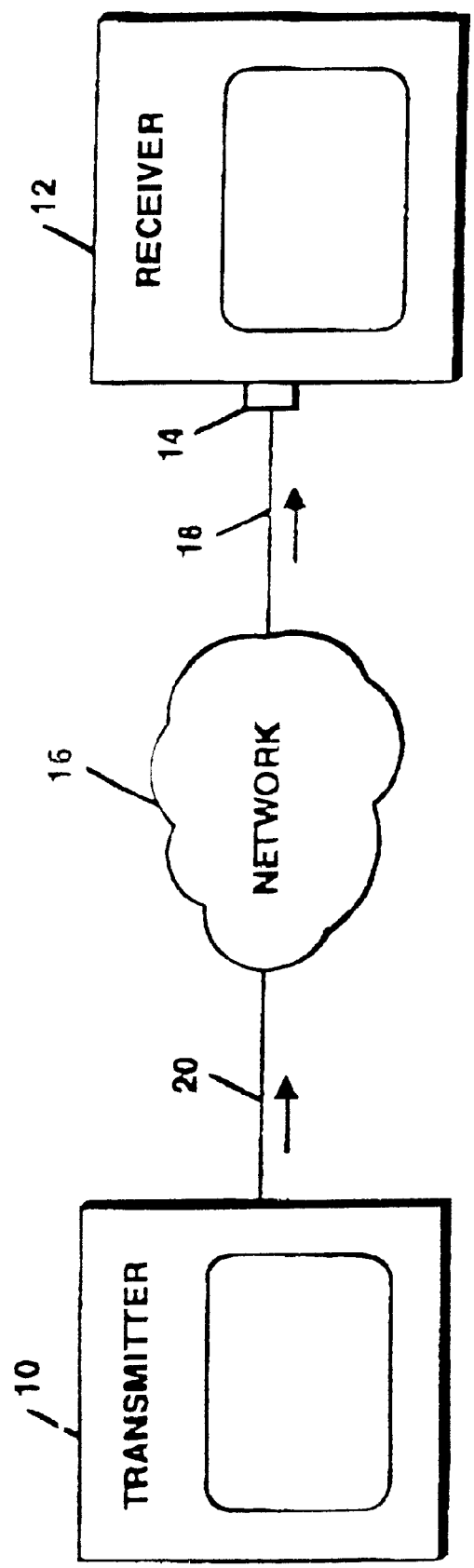
FIG. 1 is a schematic illustration of a network having a transmitting device and a receiving device.

FIG. 1 is a schematic illustration of a system for transmitting a data signal from a transmitting device (transmitter 10) to a receiving device (receiver 12). The invention (hereinafter referred to as "attenuator" and identified by reference number 14), which removes high frequency transients from the received data signal, is detachably connected to the exterior of the receiver 12. In the preferred embodiment, the receiver 12 is a video terminal such as, for example, a model VT420™ video terminal, available from Digital Equipment Corporation of Maynard, Massachusetts. The system includes the transmitter 10 for transmitting the data signal, the receiver 12 for receiving the data signal from the transmitter 10, and a network 16 for transmitting the data signal from the transmitter 10 to the receiver 12. A single-ended data transmission line 18 is connected to the attenuator 14 for transmitting the data signal from the network 16 to the receiver 12. In the preferred embodiment, the single ended line 18 extends from a terminal server (connected to the network 16 via a network device such as a bridge or router) to the attenuator 14. The transmitter 10 also may include a transmission line 20, which may be any type of line known in the art.

Figure 2:
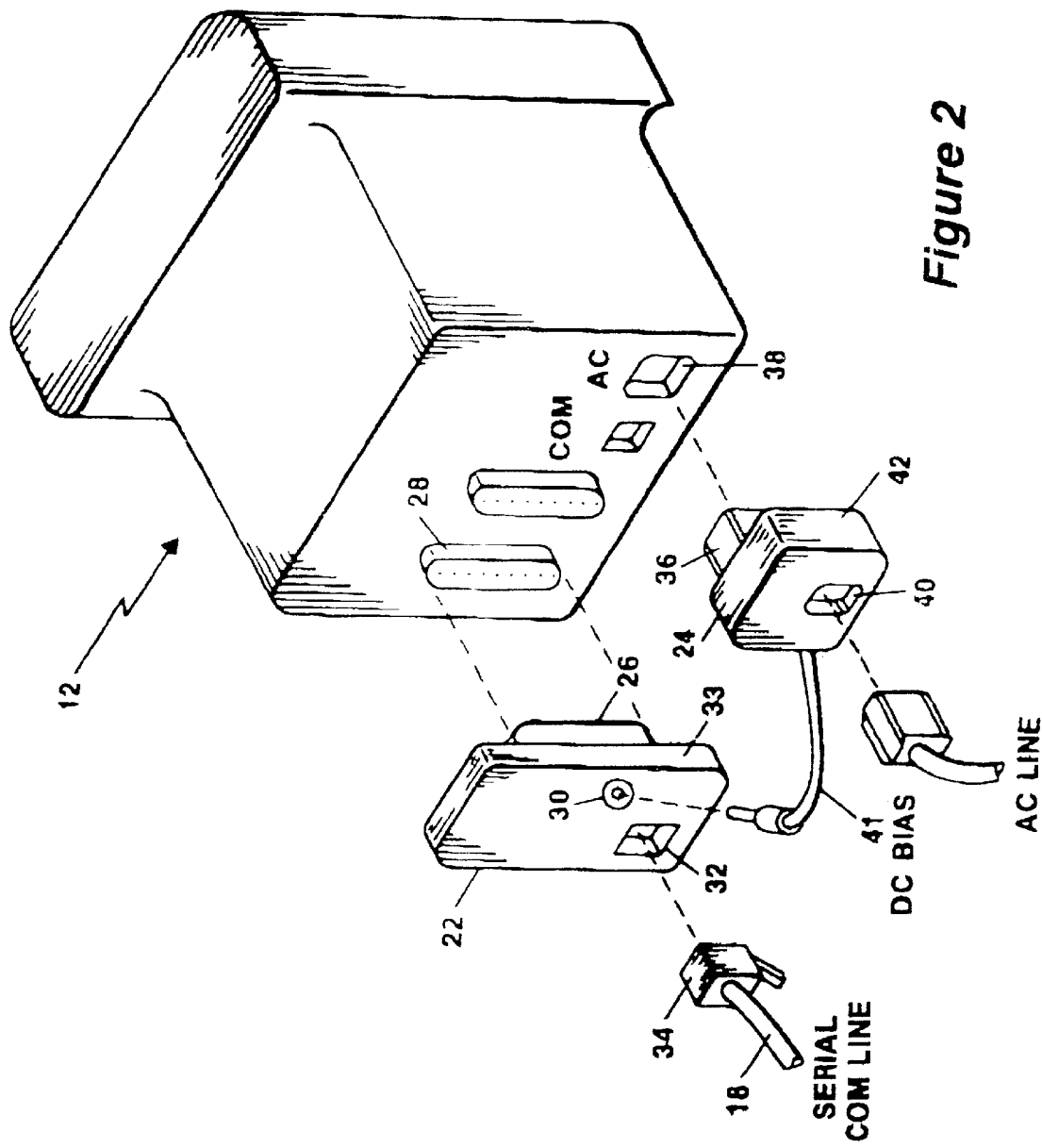
FIG. 2 is a schematic illustration of a preferred embodiment of the attenuator and its connections to the receiver.

FIG. 2 shows a preferred embodiment of the attenuator 14 for use with the system shown in FIG. 1. Specifically, the invention includes a filtering module 22 for filtering high frequency noise from the data signal, and a biasing source 24 for powering the filtering module 22 and amplifying the signal after the signal is filtered by the filtering module 22. The filtering module 22 preferably is entirely self-contained and is readily attachable to and detachable from the exterior of the receiver 12. Similarly, the biasing source 24 also preferably is entirely self-contained and is readily attachable to and detachable from the exterior of the receiver 12. Clips (not shown) may be provided on the exterior of the filtering module 22 and biasing source 24 to provide a secure fit to the receiver 12. In an alternative embodiment, the filtering module 22 and biasing source 24 are a single unit.

The preferred filtering module 22 includes a filter connector 26 for connecting the filtering module 22 to an external serial port 28 (e.g., a shielded DB25 serial port with 25 pins or a modified modular jack type 6-line unshielded connector) on the receiver 12, a bias socket 30 for receiving DC bias power from the biasing source 24, and a line socket 32 for receiving the single-ended data transmission line 18. The line socket 32 is configured to mate with a corresponding plug 34 on the end of the single-ended line 18. The filtering module 22 also includes internal filtering circuitry (FIG. 3) within a surrounding housing 33. When connected to the serial port 28 of the receiver 12, the signal is transmitted through the filtering module 22 and into the receiver 12 via the serial port 28.

The biasing source 24 includes a bias connector 36 for connecting the biasing source 24 to an AC socket 38 in the receiver 12, a power socket 40 for receiving power from an AC power line, and a DC bias line 41 for transmitting the DC bias signal to the filtering module 22. The biasing source 24 also includes internal biasing circuitry (FIG. 3) within a surrounding housing 42. Since the preferred filtering module 22 attenuates the amplitude of the signal (by about five times its original amplitude), the biasing source 24 cooperates with the filtering module 22 to restore the signal to an amplitude approximating that of the originally transmitted data signal.

Figures 3, 4:
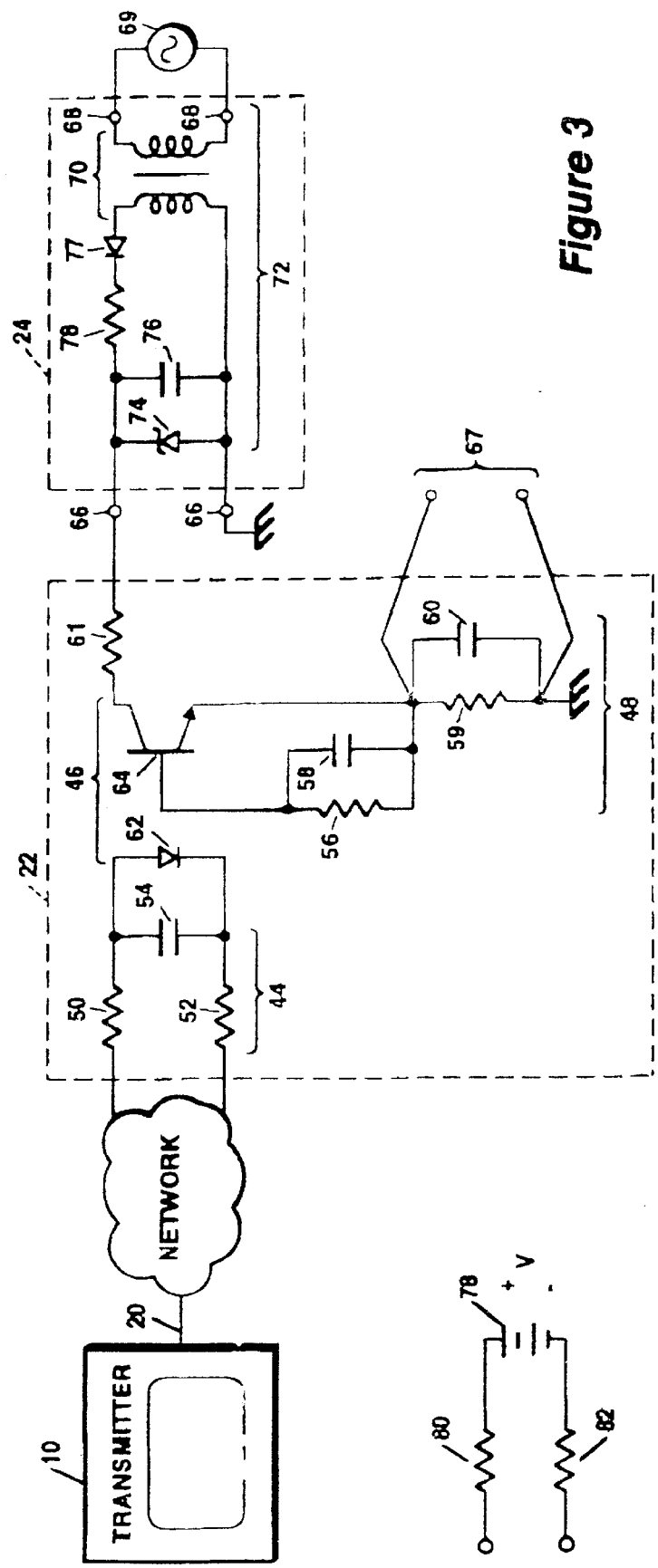
FIG. 3 is a circuit diagram of the preferred embodiment of the attenuator using a transformer for a DC biasing source.
FIG. 4 is a schematic illustration of an alternative biasing source utilizing a battery.

FIG. 3 is a circuit diagram of the preferred embodiment of the filtering module 22 and the biasing source 24. The filtering module 22 includes a first set of passive elements 44, an optocoupler 46, and a second set of passive elements 48. The first set of passive elements 44, which is a closed loop comprising a first resistor 50, a second resistor 52 and a first capacitor 54, is configured to limit current into the filtering module 22, and to combine with the optocoupler 46 and second set of passive elements 48 for filtering the signal.

The second set of passive elements 48 includes a third resistor 56, a second capacitor 58, a forth resistor 59, and a third capacitor 60. A fifth resistor 61 also may be included to limit current flow from the biasing source 24. The optocoupler 46, which may be a G.E. model number 4N36 optoisolator, available from General Electric Company, electrically isolates the receiver 12 while also filtering high frequency noise from the data signal. Low speed optocouplers, which typically have a transfer characteristic roll-off of between about one and two megahertz, should produce satisfactory results for this application. The optocoupler 46 includes a light emitting diode 62 and a photodetector 64 in an emitter follower configuration. The filtering module 22 also includes a power interface 66 for electrically connecting to the biasing source 24, and an output 67 for connecting to the serial port 28 of the receiver 12.

The biasing source 24 includes terminals 68 for electrically connecting to an AC power source 69, a transformer 70 in parallel with the AC power source 69, and rectifying circuitry 72 for rectifying a power signal from the transformer 70. Half-wave rectification should produce satisfactory results. The rectifying circuitry 72 includes a zener diode 74 having a reverse breakdown voltage of approximately 6.2 volts, a fourth capacitor 76, a sixth resistor 78, and a diode 77. Previously conducted tests have demonstrated that the following element values should produce satisfactory results:

| | |
|---|---|
| First resistor 50: | 180 ohms; |
| Second resistor 52: | 180 ohms; |
| Third resistor 56: | 470,000 ohms; |
| Forth resistor 59: | 2,000 ohms; |
| Fifth resistor 61: | 560 ohms; |
| Sixth resistor 78: | 330 ohms; |
| First capacitor 54: | 4,700 picofarads; |
| Second capacitor 58: | 4,700 picofarads; |
| Third capacitor 60: | 47 picofarads; and |
| Fourth capacitor 76: | 10 microfarads. |

It should be noted that these element values are not intended to be limiting and that the element values may be modified as necessary by those skilled in the art.

FIG. 4 shows an alternative embodiment of the biasing source 24 in which a battery 78 is utilized in lieu of the rectified transformer circuit. In this embodiment, the biasing source 24 and filtering module 22 together form a single unit that is connectible to the serial port 28 on the receiver 12. In addition to the battery 78, this alternative biasing source 24 includes a seventh resistor 80 and a eighth resistor 82 for limiting current from the battery 78. Values of approximately 100 ohms for the seventh resistor and approximately 100 ohms for the eighth resistor have produced satisfactory results. The battery 78 may be a four ampere per hour gel type battery. The battery life is relatively long in this application because the attenuator circuit has a low power consumption rate. Means may be provided to remove the DC battery 78 from the interior of the housing 33 when it becomes depleted. The battery 78 then either may be replaced or recharged.

Figure 5:
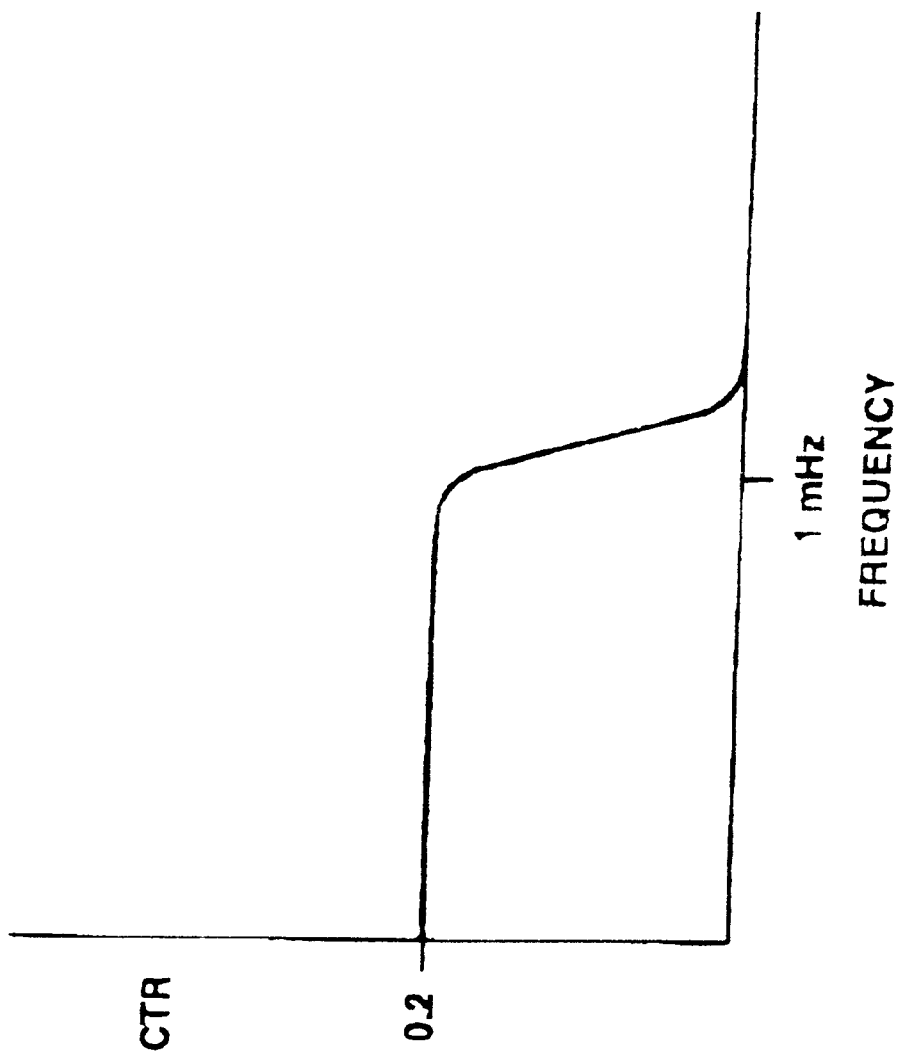
FIG. 5 is a graphical representation of the approximate current transfer ratio of an optocoupler used in the preferred embodiment of the attenuator.

During operation, the attenuator 14 should filter high frequency noise from the data signal. FIG. 5 shows a graphical representation of the current transfer ratio of the optocoupler 46 as a function of the frequency of the data signal. Noise signals superimposed on the data signal are substantially attenuated by approximately twenty decibels per decade (i.e., approximately ten times) for frequencies greater than about one megahertz. As shown in the latter figure, the current transfer ratio is about 0.2 for signals having frequencies lower than about one megahertz. This requires that the biasing source 24 provide enough power to restore (i.e. amplify) the transmitted signal to close to unity.

Accordingly, due to its portability, the attenuator 14 may be easily attached to existing receivers that do not have noise filtering capability. This eliminates the need to redesign such existing receivers.

In an alternative embodiment, the filtering module 22 may include a non-isolating active circuit element for filtering the signal. Such active element may include any active and/or passive elements known in the art.

It should be understood that the foregoing description of the invention is intended merely to be illustrative thereof and that other modifications, embodiments, and advantages of the invention may be apparent to those skilled in the art without departing from its spirit.

What is claimed is:

1. An attenuator for attenuating a signal from a single-ended line, the single-ended line being connectible to a receiving device having an exterior, the attenuator comprising:
   an optocoupler;
   said optocoupler comprising a light-emitting device and a light receiving device contained within; and
   a biasing source for biasing the optocoupler;
   the attenuator being detachably connectible to the exterior of the receiving device; and
   wherein said optocoupler and said biasing source attenuate said signal.

2. The attenuator as defined by claim 1 wherein the optocoupler is exterior to the receiving device.

3. The attenuator as defined by claim 1 wherein the biasing source includes a transformer.

4. The attenuator as defined by claim 3 wherein the biasing source includes a half-wave rectifier.

5. The attenuator as defined by claim 1 wherein the biasing source includes a battery.

6. The attenuator as defined by claim 1 wherein the attenuator is self-contained within a housing.

7. The attenuator as defined by claim 1 further including a passive electronic element connected to the optocoupler.

8. The attenuator as defined by claim 1 wherein the receiving device includes an exterior interface, the attenuator further including a connector for connecting the attenuator to the exterior interface.

9. An attenuator for attenuating a signal from a single-ended line, the single-ended line being connectible to a receiving device having an exterior, the attenuator producing an attenuated signal and comprising;
   an optocoupler;
   a biasing source for biasing the optocoupler;
   said optocoupler comprising a light-emitting device and a light receiving device contained within;
   a connector for connecting the attenuator to the exterior of the receiving device; and
   said optocoupler and said biasing attenuate said signal.

10. The attenuator as defined by claim 9 wherein the biasing source is exterior to the receiving device.

11. The attenuator as defined by claim 9 wherein the optocoupler is exterior to the receiving device.

12. The attenuator as defined by claim 9 wherein the biasing source includes a transformer.

13. The attenuator as defined by claim 12 wherein the biasing source includes a half-wave rectifier.

14. The attenuator as defined by claim 9 wherein the biasing source includes a battery.

15. The attenuator as defined by claim 9 further including a passive electronic element connected to the optocoupler.

16. The attenuator as defined by claim 9 further including:
   a resistor connected to the optocoupler; and
   a capacitor connected to the optocoupler.

17. The attenuator as defined by claim 9 wherein the receiving device includes an external interface, the connector being connectible to the external interface.

18. The attenuator as defined by claim 9 wherein the attenuated signal is attenuated at frequencies greater than about one megahertz.

19. The attenuator as defined by claim 9 wherein the optocoupler is a low speed optocoupler.

20. A data transmission system comprising:
   a transmitting device;
   a receiving device having an exterior;
   a single-ended data transfer line for transmitting a signal between the transmitting device and the receiving device;
   an attenuator for attenuating said signal, the attenuator including an optocoupler and being connectible to the exterior of the receiving device;
   said optocoupler comprising a light-emitting device and a light receiving device contained within.

21. The data transmission system as defined by claims 20 wherein the attenuator further includes an external biasing source for biasing the optocoupler, the biasing source being connectible to the exterior of the receiving device.

22. The data transmission system as defined by claim 21 wherein the biasing source is a battery.

23. The data transmission system as defined by claim 21 wherein the biasing source includes a transformer.

24. The data transmission system as defined by claim 20 wherein the attenuator is self-contained within a housing.

25. The data transmission system as defined by claim 20 wherein the attenuated signal is attenuated at frequencies greater than about one megahertz.

26. The data transmission system as defined by claim 20 wherein the receiving device includes an exterior interface, the attenuator connecting to the exterior interface.

27. An attenuator for attenuating a signal from a data transmission line, the data transmission line being connectible to a receiving device having an exterior, the attenuator comprising:
   a low pass filtering circuit including an optocoupler;
   a biasing source for biasing the filtering circuit; and
   a connector for connecting the filtering circuit to the exterior of the receiving device;
   said optocoupler comprising a light-emitting device and a light receiving device contained within; and
   wherein said optocoupler and said biasing source attenuate said signal.

28. The attenuator as defined by claim 27 wherein the data transmission line is a single ended line.

29. The attenuator as defined by claim 27 wherein the receiving device includes an interface, the connector connecting to the interface, the attenuator being in electrical communication with the receiving device through the interface.

30. The attenuator as defined by claim 27 wherein the filtering circuit attenuates the signal at frequencies greater than about one megahertz.

31. The attenuator as defined by claim 27 further including a second connector for connecting the biasing source to the exterior of the receiving device.

* * * * *